Aug. 31, 1937.  L. J. WOLF  2,091,697
INDICATING MECHANISM
Filed April 20, 1935   3 Sheets-Sheet 1
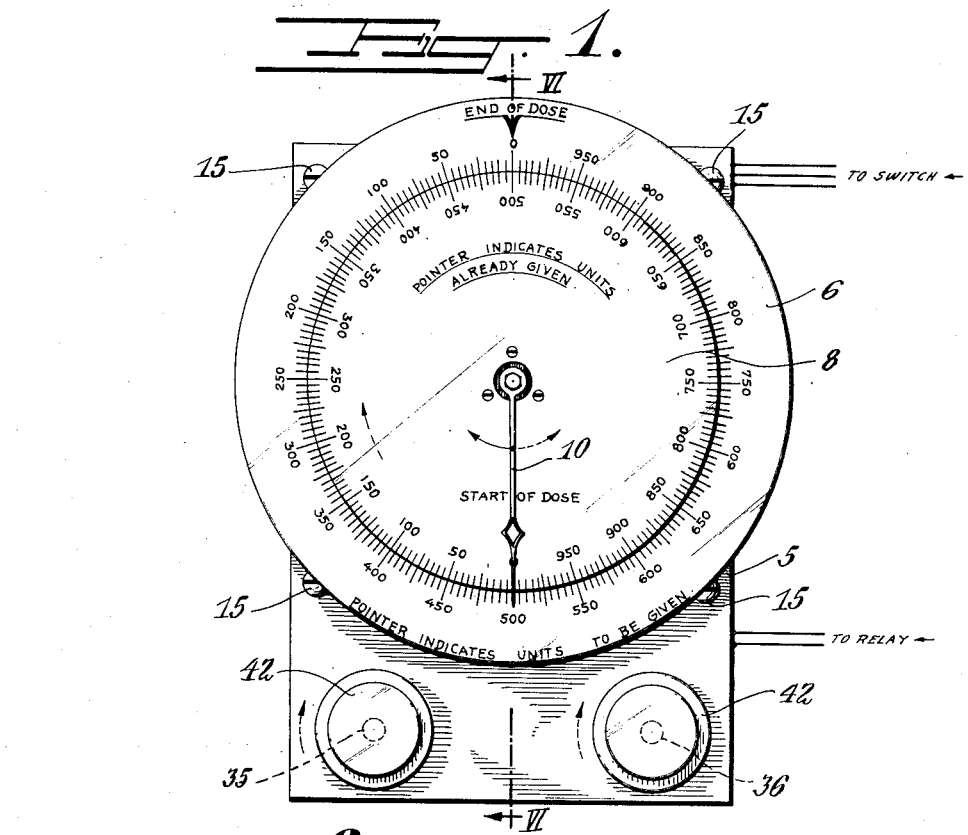
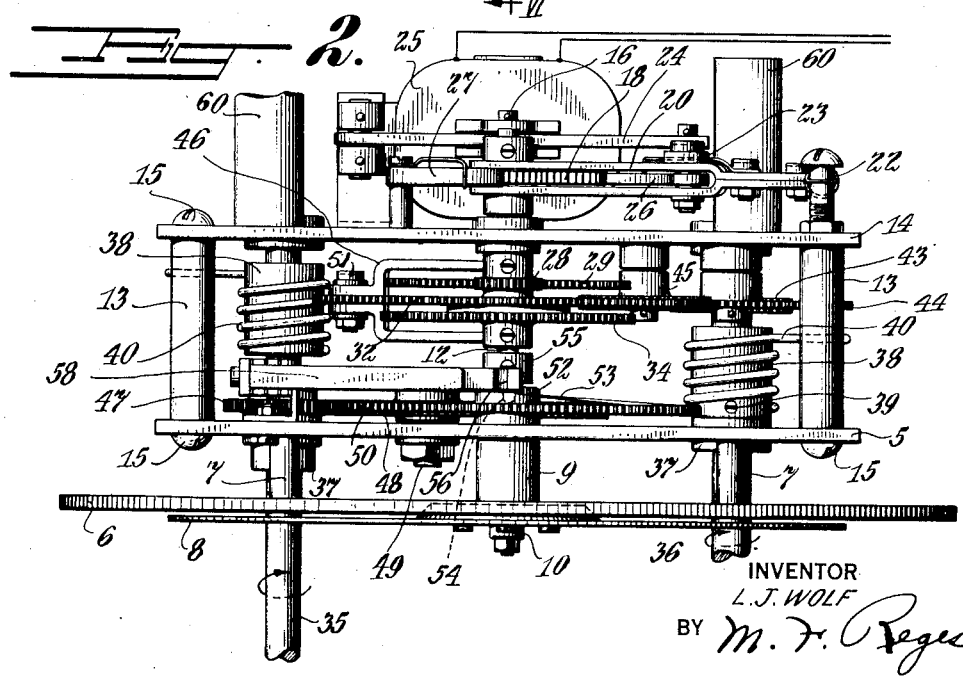
INVENTOR
L. J. WOLF
BY M. F. Reger
ATTORNEY

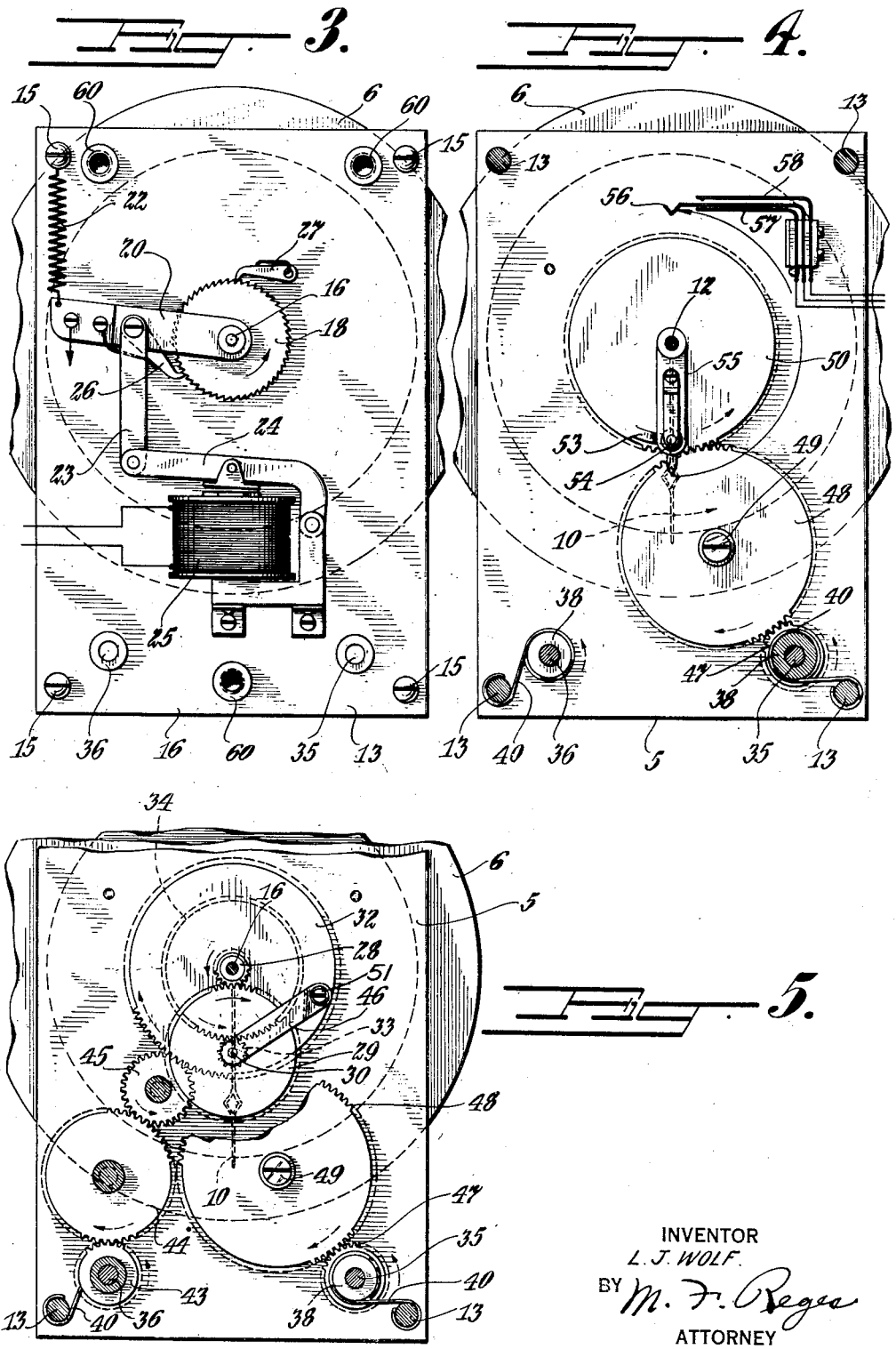

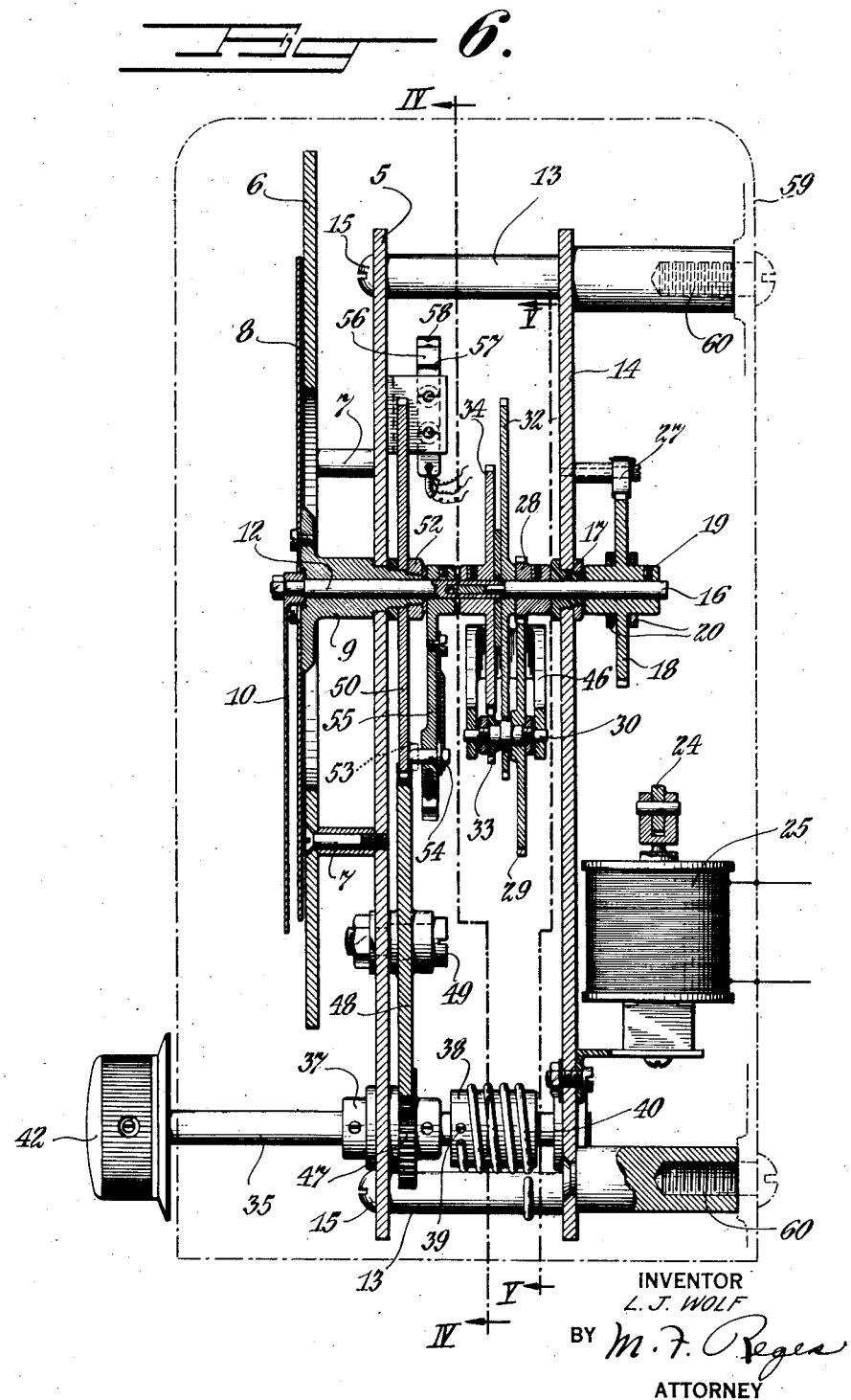

Patented Aug. 31, 1937

2,091,697

UNITED STATES PATENT OFFICE 2,091,697

INDICATING MECHANISM

Lester J. Wolf, Cranford, N. J., assignor, by mesne assignments, to Westinghouse X-Ray Company, Inc., a corporation of Delaware Application April 20, 1935, Serial No. 17,468

5 Claims. (Cl. 235—132)

My present invention relates to indicating mechanism and more particularly to such mechanism as is used with apparatus known to the art as dosimeters for measuring the radiations emanating from a source of radiant energy within the invisible portions of the spectrum.

It has long been recognized in the prior art that X-rays when administered in proper dosage have a beneficial therapeutic effect upon the human body. However, it is imperative that the applied dosage be always more or less exact for in the event of an insufficient dosage the most beneficial results are not obtained and should an over dosage be administered the beneficial results obtained are offset by a deleterious effect to the skin which produces erythema. Likewise the same condition prevails in the case of ultraviolet radiations although in this latter instance ultraviolet radiations find still further application in other fields.

For example, ultraviolet radiation is known to have a highly bactericidal effect which readily kills the spores of bacteria and fungi in various food products. It is again essential that the dosage applied to such food products also be exact inasmuch as an over dosage causes detrimental chemical reaction with resultant rancidity in some instances or destruction of the edibility and palatability of such products.

In order to measure the radiations emanating from a radiant energy source it is customary to subject a radiation responsive device to the field of radiations along with the subject treated. Such a device together with an operating circuit is shown in the patent to Arthur Mutscheller, No. 2,036,072 issued March 31, 1936, assigned to the same assignee as the instant invention and insofar as the indicating mechanism therein shown is concerned my present invention constitutes an improvement thereon.

It is accordingly an object of my present invention to provide an indicating mechanism which may be preset for any desired quantity of radiations and wherein the mechanism accurately registers the quantity already administered and yet to be administered at each interval for a preselected total dosage.

Another object of my invention is the provision of an indicating mechanism for giving a visual indication of the quantity of radiations already administered and yet to be administered at any given moment for a preselected total quantity.

Another object of my present invention is the provision of indicating mechanism having one dial for registering any desired total dosage together with a second dial which may be preset with respect to the fixed dial for such total dosage and a rotatable pointer is periodically operable which so cooperates with both dials as to give an immediate visual indication of the dosage already administered and yet to be administered at each and every interval for a preselected total dosage.

Another object of my invention is the provision of indicating mechanism which may be preset for any desired total dosage wherein such mechanism will give a visual indication of the dosage already administered and yet to be administered at each interval during the application of the preselected total dosage and which upon the application of the total dosage is operable to set electrical apparatus into operation for the purpose of sounding an alarm and/or causing an interruption in the generation of radiant energy by a suitable source.

A further object of my invention is the provision of indicating mechanism for giving a visual registration of the dosage already administered and yet to be administered at any given interval for a preselected total dosage which is efficient and accurate in its operation and economical to manufacture.

Still further objects of my present invention will become obvious to those skilled in the art by reference to the accompanying drawings wherein:

Figure 1 is a front elevational view of an indicating mechanism constructed in accordance with my present invention without its protecting housing or casing.

Fig. 2 is a top plan view of the device shown in Fig. 1.

Fig. 3 is a rear elevational view of the mechanism shown in Fig. 1.

Fig. 4 is a sectional view taken on line IV—IV of Fig. 6 looking in the direction shown by the arrows.

Fig. 5 is a sectional view taken on the line V—V of Fig. 6 looking in the direction indicated by the arrows; and Fig. 6 is a sectional view on a slightly enlarged scale taken on the line VI—VI of Fig. 1 looking in the direction indicated by the arrows and showing in outline its protective housing.

Referring now to the drawings in detail I have shown in Fig. 1 a panel 5 provided on its face with a circular stationary dial 6 suitably secured thereto as by lugs and screws 7 (Fig. 6). A coaxially disposed inner adjustable dial 8 of smaller diameter than the outer dial is similarly secured to a short shaft 9 journaled in and protruding through the panel 5, as can be more readily seen from Fig. 6.

Both the dials 6 and 8 are provided with identical graduated scales or indicia corresponding to degrees of dosage or quantity of radiant energy with the outer dial 6 registering the dosage yet to be given and the inner dial 8 the dosage already given at any given interval for a preselected total dosage or quantity of radiations. For instance, when the apparatus is utilized for the measurement of X-rays each graduation may correspond to one or more "r" units which is a definite quantity of measurement at present employed in connection with X-rays and where the apparatus is employed for the measurement of ultraviolet each graduation would naturally correspond to some such similar unit of measurement.

A rotatable hand or pointer 10 cooperates with the dials 6 and 8 and is rigidly secured to a coaxially disposed shaft 12 extending through and beyond the shaft 9. Secured in spaced relation to the front panel 5 by any suitable means, such as spacers 13, is a rear panel 14 engaged by screws or the like 15 passing through the respective panels. A shaft 16 is provided with a slightly reduced diameter portion which engages a longitudinally extending hole formed in the end of the shaft 12 and is additionally journaled in a bearing 17 provided in the rear panel 14. For the purpose of rotating this shaft 16 a ratchet gear 18, having a fixed ratio relative to movement of the pointer 10 so that upon rotation of the ratchet 18 the pointer 10 is moved one graduation of the dials 6 and 8, is rigidly secured to the shaft 16 such as by a set screw or the like 19. In order to cause rotation of the ratchet gear 18 and shaft 16 a yoke member 20 is journaled upon the hub of the ratchet gear 18 and its free end is biased by means of a coil spring 22 (Fig. 3). A link bar or the like 23 is pivotally secured to the yoke member 20 and also to a pivoted arm 24 constituting the armature of a relay 25 suitably mounted upon the rear panel 14. Also pivotally connected to the yoke member 20 and engaging the ratchet gear 18 is a spring pressed pawl 26. Upon downward movement of the relay armature 24 in response to energization of the relay 25, as hereinafter described, the link bar 23 as well as the yoke 20 and pawl 26 are also moved downwardly as seen from Fig. 3, with attendant counter-clockwise rotation of the gear 18 and shaft 16. To prevent slippage or clockwise rotation of the ratchet gear 18 a second spring pressed pawl 27 is pivotally secured to the rear surface of the panel 14 which likewise engages the gear 18.

The ratchet gear 18 and shaft 16 are connected to the pointer 10 through a connection comprising a gear 28 rigidly secured to the shaft 16 which meshes with a spur gear 29 having a definite ratio therebetween, for example, 1:4 or in other words, the gear 29 is provided with four times the number of teeth as its driving gear 28. This spur gear 29 is rigidly secured to a shaft 30 which passes loosely through the perimeter of a gear 32 loosely mounted upon the shaft 16, and a gear 33 is also rigidly mounted upon this shaft 30 and meshes with a further spur gear 34 rigidly affixed to the shaft 12 to which the pointer 10 is secured. The ratio between these latter gears 33, 34, likewise is fixed, such for example, as 1:5, so that the maximum ratio between the ratchet gear 18 and the pointer 10 is 1:20 in order for the pointer to move one graduation or 1/1000th of a revolution for each 1/50th of a revolution of the ratchet gear 18.

Accordingly upon periodic energization of the relay 25 in response to the quantity of radiant energy emanating from a suitable source falling upon a radiation responsive device, as shown in the aforementioned Mutscheller application, the ratchet gear 18, shaft 16, and gear 28 will rotate in a counter-clockwise direction as viewed from the rear of the panel 14, such as shown by the arrow in Fig. 3. This causes clockwise rotation of the gears 29, 33, with counter-clockwise rotation of the gear 34 and pointer 10, or clockwise rotation of the latter when viewed from the front of panel 5 as shown by the arrow in Fig. 1. It should be noted that the shaft 30 carrying the gears 29, 33 remains in a fixed position despite the fact it passes through the perimeter of the gear 32 which is loosely mounted upon the shaft 16. This is due to the fact that although the gear 32 is loosely mounted upon the shaft 16 it is prevented from rotating by the resetting mechanism now about to be described.

Suitably journaled in both the panels 5 and 14 are a pair of shafts 35 and 36 extending a substantial distance through the front panel 5 and held against longitudinal movement by collars or the like 37, rigidly secured to these respective shafts. Intermediate the panels 5 and 14 each of the shafts 35 and 36 has an elongated collar 38 rigidly secured thereto as by a set screw or the like 39 thus substantially forming drums as can be appreciated from Figs. 2 and 6. A coil spring 40 is wound in a counter-clockwise direction about each of the drums 38 with one end thereof secured to the adjacent spacers 13 while the remaining ends are free upon the drum to thus form an overriding clutch arrangement.

Accordingly upon rotation of the shafts 35 and 36 in a clockwise direction, such as by hand knobs 42 from the front of the panel 5, to set the dial 8 and pointer 10 these springs tend to unwind thus slightly releasing some of their potential energy, whereas counter-clockwise rotation is prevented by the tendency of the springs to wind more tightly due to their frictional engagement with the drums 38.

Rotation of the hand knob 42 affixed to the shaft 36 in a clockwise direction causes clockwise rotation of a gear 43 rigidly secured to this shaft. Referring now more particularly to Fig. 5, which is taken from a direction opposite to the front of the panel 5 this gear 43 is shown as being rotatable in a counter-clockwise direction and meshing with a further gear 44 journaled to the front surface of the rear panel 14 which thus rotates clockwise. Similarly another gear 45 is journaled to the front of panel 14 which gear meshes with the gear 44 as well as the loosely mounted gear 32 thus imparting the clockwise rotation of the gear 44 to that of the gear 32 when the control knob 42 is rotated. Rotation therefore of the gear 32 in response to the rotation of the control knob 42 thus imparts planetary movement of the shaft 30 loosely passing through the perimeter of the gear 32. This shaft 30 because loosely fitting the gear 32 forms a rather poor bearing therefor which might allow lateral movement of the shaft together with movement of the gears 29 and 33 thus causing the latter to become disengaged from the respective gears 28 and 34. To prevent this as well as to form better bearings for the shaft 30 it is journaled at its ends in a yoke 46 with this yoke in turn being rigidly secured to the perimeter of the gear 32 in any suitable manner, such as by a bolt 51, and consequently forming what might be said to constitute an integral part of the gear 32 assisting the planetary motion of shaft 30 as above noted.

Inasmuch as the overrunning clutch arrangement formed by the drum 38 and spring 40 together with the gear train comprising the gears 43, 44, and 45 normally prevent rotation of the loosely mounted gear 32, the shaft 30, as before mentioned, remains stationary thus permitting the ratchet gear 18 to rotate the pointer 10 through the gears 28, 29, 33, 34.

The shaft 35 is likewise provided with a gear 47 meshing with a gear 48 suitably journaled upon a short shaft 49 secured to the rear surface of the front panel 5 and this latter gear 48 in turn engages a gear 50 rigidly secured to the dial shaft 9 as by means of a locknut 52. Thus upon clockwise rotation of the control knob 42 affixed to the shaft 35 there follows (as viewed from Figs. 4 and 5) counterclockwise rotation of gear 47, clockwise rotation of gear 48, and counter-clockwise rotation of gear 50 with clockwise rotation of dial 8 as viewed from the front of the panel 5.

The rear surface of the gear 50 has a cam surface 53 so positioned as to constitute a stop for the pointer 10 in alignment with the zero graduation of the inner dial 8 and is arranged to be engaged upon counter-clockwise rotation of the pointer by a spring pressed plunger 54 carried by a rotatable arm 55 rigidly affixed to the pointer shaft 12. Insulatingly mounted on the rear surface of the panel 5 in the path of rotation of the arm 55 are a plurality of contact members which may be connected to electrical apparatus (not shown) for the purpose of signaling an operator or interrupting the generation of the radiant energy. For example, by reference more particularly to Fig. 4 one pair of contact members 56 and 57 may be normally closed and so associated with the radiant energy source as to control energization thereof.

Upon the rotation of the arm 55 it engages one of the contact members 56 thus interrupting the engagement thereof with the contact member 57 which may cause a cessation in the generation of the radiant energy and immediately thereafter establishes engagement of the contact member 56 with a further contact member 58 to complete an alarm circuit or the like.

In the event, however, it is desired to continue the treatment beyond the point where the pointer 10 registers with the zero graduation arrow on the outer dial 6, the contact member 56 may be disconnected so as to have no influence upon the generation of the radiant energy and the contact members 56 and 58 alone utilized to operate signal apparatus. The entire apparatus is encased in a cabinet or casing 59, such as shown in outline in Fig. 6, which is secured to the apparatus as by lugs and screws 60.

The operation of my indicating mechanism may be best understood by assuming it has been previously utilized and it is desired to again employ the same for measuring the radiations emanating from a source of ultraviolet or X-rays. The desired dosage to be administered, having been previously predetermined as is well known, the left hand knob 42 (Fig. 1) is rotated in a clockwise direction which in turn causes clockwise rotation of the dial 8, through the intermediary of the gears 47, 48, and 50, until the zero graduation on the dial 8 corresponds to the total dosage desired appearing upon the fixed dial 6 assumed to be 500 units as shown in Fig. 1. This, as before stated, necessarily aligns the total dosage graduation (assumed to be 500) upon the inner or movable dial 8 with the zero graduation of the outer dial 6 corresponding to the end of dosage as indicated by the arrow shown in Fig. 1.

Regardless of the position of the pointer 10 the right hand control knob 42 is next rotated in a clockwise direction as shown in Fig. 1. Such rotation is accompanied by rotation of the gears 43, 44, 45, and 32 in the respective directions as hereinbefore described with reference to Fig. 5.

By reference particularly to Figs. 2, 3, 5, and 6, it will be seen that upon clockwise rotation of the control knob 42 (as viewed in Figs. 1 and 2) the gear 32 is likewise rotated in a clockwise direction (viewed from Fig. 5) through the intermediary of the respective gears, 43, 44, and 45 which rotate in the respective directions indicated by the arrows in Fig. 5. This clockwise rotation of gear 32 causes a planetary movement of the shaft 30, due to the latter passing loosely through the perimeter of the gear 32, as well as the fact the yoke 46 is rigidly secured to this gear 32 and forms a bearing for the shaft 30. This necessarily imparts planetary movement, also in a clockwise direction (as viewed in Fig. 5), to the respective gears 29 and 33. Such planetary movement of gear 33, which is in mesh with the gear 34, causes rotation of this latter gear also in a clockwise direction substantially in unison with the gear 32 due to the pulling force exerted on the periphery of the gear 34 by the planetary movement of gear 33.

This clockwise rotation of gear 34 likewise causes similar rotation of the shaft 12 accompanied by counter-clockwise rotation of the pointer 10 (as viewed in Fig. 1) which movement is continued until the spring pressed plunger 54, carried by the arm 55, contacts the flat side of the cam 53 at which time the pointer 10 will then be in alignment with the zero graduation on the previously set inner dial 8.

Simultaneously with planetary movement of the shaft 30 and gear 33 similar movement, as before noted, is imparted in a clockwise direction (viewed from Fig. 5) to the gear 29. This gear 29 being in mesh with the gear 28, which latter gear is prevented from clockwise rotation by the pawls 26 and 27 engaging the ratchet gear 18, thus precludes rotation of the gear 28 with the result that the gear 29 simply rolls around the gear 28 without effecting movement thereof. It is to be noted, however, that upon planetary movement of the gears 29 and 33 there is a tendency for the gear 33 to rotate the gear 34 in a counter-clockwise direction at the same time it is exerting a pulling force on the periphery accompanied by clockwise rotation of gear 34 in unison with that of gear 32. This is also true of the rolling movement of gear 29 around gear 28 tending to rotate the latter in a counter-clockwise direction which movement of gear 28 would not be precluded by the ratchet gear 18. However, it is to be noted that due to the ratio between movement of the pointer and that of the ratchet gear 18, which as before noted has an overall ratio of 1 to 20, the pointer can be correctly set without the ratchet gear moving in a counter-clockwise direction one tooth except upon a complete rotation of the pointer 10. Thus the effect of this tendency of the gear 28 to rotate in a counter-clockwise direction as well as that of gear 34 results merely in a slight retardation in movement of the pointer 10 in comparison to its forward resetting movement and clockwise movement (viewed from Fig. 1) of the pointer 10 never occurs during the resetting or zeroizing operation.

The apparatus is thus in position for operation for administering the desired dosage and upon energization of the radiant energy source the relay 25 is periodically energized. Upon each energization of the latter accompanied by rotation of the ratchet gear 18 the pointer 10 will be moved in the manner hereinbefore stated one graduation due to the fixed ratio between the ratchet gear and the dial graduations. Inasmuch as the inner dial 8 indicates the quantity already given and the outer fixed dial 6 the quantity yet to be administered for any preselected total dosage the operator can at any given instant ascertain the condition of treatment.

After the desired or preselected quantity has emanated from the source the arm 55 will engage the contact member 56 thus causing the giving of an appropriate signal and/or the cessation of the generation of the radiant energy by the source. Should it be desired to continue the treatment the contact member 56 may be so arranged as to cause operation of a signal device, as before stated, in which event the pointer 10 will continue to rotate in a clockwise direction after the arm 55 causes closure of the contact members 56, 58 and if the pointer continues it may make one or more complete revolutions as the spring pressed plunger 54 will ride over the cam 53.

It should be noted that under certain conditions it may be necessary in order to preset the dial 8 for a desired dosage to rotate the same in a clockwise direction beyond a point where the pointer 10 has previously stopped. Under such a condition the flat surface of the cam 53 will contact the spring pressed plunger 54 carried by the arm 55 in the same manner as though the pointer had been moved counter-clockwise back to the zero graduation. However, further rotation of the inner dial 8 is by no means prevented as the cam 53 will cause the pointer 10 to be carried along with the dial 8 in its clockwise direction despite the fact that the normal resetting rotation of the pointer is in a counter-clockwise direction. This is due to the fact that the arm 55, which is in driving connection with the cam 53 carried by the gear 50, serves to drive the shaft 12 and its connected reduction gearing in the same direction as though driven by the ratchet gear 18 thus rotating this latter gear in a counter-clockwise direction as viewed from Fig. 3, so that the pawls 26 and 27 which are normally held in mesh with the gear 18 by their respective springs, ride over the gear teeth until the right hand knob 42 is no longer rotated. Moreover, the rotation of both resetting knobs 42 is limited to a clockwise direction because, as before stated, the overriding clutch arrangement precludes rotation in an opposite direction.

It thus becomes obvious to those skilled in the art that I have provided indicating mechanism particularly adaptable for the measuring of radiant energy emanating from a source which generates such radiations within the invisible portions of the spectrum. In addition the mechanism can be preset for any desired total dosage and at any given interval during the administration of such dosage the apparatus gives an immediate visual registration of the portion of the total dosage already given and yet to be given merely by glancing at the cooperating dials. Moreover, such mechanism is exceedingly efficient in its operation and economical to manufacture.

Although I have shown and described one specific embodiment of my invention I do not desire to be limited thereto as various other modifications of the same may be made without departing from the spirit and scope of the appended claims.

What is claimed:

1. An indicating mechanism comprising stationary means provided with indicia about its perimeter corresponding to certain units, rotatable means concentrically disposed relative to said stationary means and provided with identical indicia as the latter, means for rotating said rotatable means for the purpose of preselecting a definite quantity of units as registered by said rotatable means when aligned with the zero indicium of said stationary means, rotating means cooperating with the indicia of both said aforementioned means and adapted to be preset to register with the zero indicium of said first mentioned rotatable means, means periodically operable to cause intermittent rotation of said last mentioned rotatable means in order that the same will register upon said stationary means the quantity of units remaining for any given total quantity after each intermittent operation of said second mentioned rotatable means and upon first mentioned rotatable means the quantity of expired units for a preselected total quantity, and means operable upon a predetermined rotation of said last mentioned rotatable means for causing the operation of electrical apparatus to indicate the expiration of the total preselected quantity of units.

2. An indicating mechanism comprising a stationary dial having graduations thereon indicative of a definite quantity of units, a second rotatable dial concentrically disposed relative to said stationary dial and provided with identical graduations about its perimeter which align with those of said stationary dial, means for rotating said rotatable dial for the purpose of preselecting a definite quantity of units when registering with the zero graduation of said stationary dial, a rotatable pointer cooperating with the graduations of both said dials and adapted to be preset to register with the zero graduation of said rotatable dial and simultaneously with a graduation of said stationary dial corresponding to the same total quantity of units indicated by said rotatable dial when in alignment with the zero graduation of said stationary dial, means periodically operable to cause intermittent rotation of said pointer in order that the same will register upon said stationary dial the quantity of units remaining of the preselected total quantity after each intermittent operation of said pointer and upon said rotatable dial the quantity of expired units for a preselected total quantity, and means operable upon a predetermined rotation of said pointer for causing the operation of electrical apparatus to indicate the expiration of the total preselected quantity of units.

3. An indicating mechanism comprising a panel, a stationary circular dial secured to said panel and provided with indicia thereon about its perimeter corresponding to certain units, a rotatable dial concentrically disposed relative to said stationary dial provided with indicia thereon about its perimeter corresponding to the indicia on said stationary dial and aligning therewith, means for rotating said rotatable dial to align certain of its indicia corresponding to a preselected quantity of units with the zero graduation of said stationary dial including a manual operable control knob positioned in front of said panel and a gear train connecting said control knob to said rotatable dial, a rotatable pointer cooperating with the indicia of both said dials and adapted to be preset to register with the zero graduation of said rotatable dial and a preselected graduation of said stationary dial indicative of a fixed quantity of units, electrical means periodically operable to cause intermittent rotation of said pointer in order that the same will register upon said stationary dial the number of units remaining for any given total quantity after each intermittent operation of said pointer and upon said rotatable dial the number of expired units for a preselected total quantity of units, and means operable upon rotation of said pointer to the preselected graduations on said rotatable dial corresponding to a total quantity of units for setting electrical apparatus into operation.

4. An indicating mechanism comprising a stationary dial provided with indicia thereon corresponding to certain units, an adjustable dial having identical indicia about its perimeter which align with those of said first mentioned dial and coaxially disposed relative to the latter, means for rotating said adjustable dial in one direction to align the indicium thereof corresponding to a preselected total quantity of units with the zero indicium of said stationary dial including a control knob, an overriding clutch arrangement associated with said control knob to restrict rotation thereof to one direction, and a gear train connected to said control knob and said adjustable dial to cause rotation of the latter in one direction in response to rotation of said control knob; a rotatable pointer coaxially disposed relative to both said dials, automatic means periodically operable to cause intermittent rotation of said pointer with registration upon said stationary dial of the quantity of units remaining for any given total quantity after each intermittent operation of said pointer and upon said adjustable dial the quantity of expired units for a preselected total quantity of units, said automatic means including a train of reduction gearing operably associated with said pointer having a freely rotatable gear and a relay connected to said train of reduction gearing and adapted to be periodically energized to cause operation of said train of reduction gearing and intermittent rotation of said pointer; means for adjusting said pointer to cause the same to align with the zero and preselected indicium of said dials prior to operation of said mechanism including a second control knob having an overriding clutch arrangement associated therewith to restrict rotation of said second control knob to one direction, a plurality of intermeshing gears associated with said second control knob and connected to said freely rotatable gear to cause rotation thereof with planetary movement of a portion of said reduction gearing and rotation of said pointer; and means operable upon rotation of said pointer to the indicium on said rotatable dial corresponding to the preselected total quantity of units for causing the operation of electrical apparatus for indicating completion of the total quantity of units.

5. An indicating mechanism comprising a stationary dial provided with indicia thereon corresponding to certain units, an adjustable dial having co-registering indicia thereon and rigidly affixed to a shaft coaxially disposed relative to said stationary dial, a gear rigidly secured to said shaft for rotating the latter and provided with a cam disposed upon the flat surface thereof, means connected to said gear and operable to rotate the same in one direction for the purpose of rotating said shaft and dial in order to align certain of the indicium of said adjustable dial with those of said stationary dial, a second shaft coaxially disposed relative to said first mentioned shaft provided with a pointer rigidly secured thereto aligning with the indicia of both of said dials, a radial arm rigidly secured to said second mentioned shaft in parallelism with said pointer and provided with a spring pressed plunger engageable with the cam disposed upon said gear to prevent rotation of said pointer in one direction beyond a fixed limit to align said pointer with the zero indicium or said adjustable dial, means for causing successive movement of said pointer from alignment with one of the co-registering indicium of said dials to the next including a reduction gear train operably associated with said pointer, a ratchet gear operably connected to said reduction gear train, and a relay periodically energizable to cause movement of said reduction gear train and pointer; means operable to initially align said pointer with the zero indicium of said adjustable dial including an overriding clutch for restricting the direction of rotation of said pointer for resetting purposes together with a gear for causing planetary movement of a portion of said reduction gear train with attendant rotation of said gear affixed to said pointer shaft; and a plurality of contact members insulatingly supported adjacent the path of movement of said radial arm and adapted to be contacted thereby for the purpose of setting electrical apparatus into operation upon rotation of said pointer to a preselected co-registering indicium of said dials.

LESTER J. WOLF.